US011201730B2

(12) United States Patent
Sofia et al.

(10) Patent No.: US 11,201,730 B2
(45) Date of Patent: Dec. 14, 2021

(54) GENERATING A PROTECTED KEY FOR SELECTIVE USE

(71) Applicant: INTERNATIONAL BUSINESS MACHINES CORPORATION, Armonk, NY (US)

(72) Inventors: Anthony T. Sofia, Hopewell Junction, NY (US); Jonathan D. Bradbury, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 295 days.

(21) Appl. No.: 16/364,292

(22) Filed: Mar. 26, 2019

(65) Prior Publication Data
US 2020/0313869 A1 Oct. 1, 2020

(51) Int. Cl.
*H04L 29/06* (2006.01)
*H04L 9/08* (2006.01)
*G06F 21/60* (2013.01)
*H04L 9/34* (2006.01)

(52) U.S. Cl.
CPC .......... *H04L 9/0822* (2013.01); *G06F 21/602* (2013.01); *H04L 9/0894* (2013.01); *H04L 9/34* (2013.01)

(58) Field of Classification Search
CPC ....... H04L 9/0822; H04L 9/34; H04L 9/0894; H04L 2209/046; G06F 21/602; G06F 21/6209
See application file for complete search history.

(56) References Cited

U.S. PATENT DOCUMENTS

| | | | |
|---|---|---|---|
| 6,108,425 A | 8/2000 | Smith, Sr. et al. | |
| 7,752,463 B2 | 7/2010 | Hahn et al. | |
| 8,111,697 B1 | 2/2012 | Panwar et al. | |
| 8,667,273 B1 | 3/2014 | Billstrom et al. | |
| 8,750,516 B2 | 6/2014 | Goodman et al. | |
| 9,288,192 B2 | 3/2016 | Buer et al. | |
| 9,483,656 B2* | 11/2016 | Leggette | G06F 21/6218 |
| 9,760,502 B2 | 9/2017 | Raam | |
| 9,767,318 B1* | 9/2017 | Dropps | G06F 21/72 |
| 2008/0130893 A1 | 6/2008 | Ibrahim | |
| 2010/0146582 A1 | 6/2010 | Jaber | |
| 2010/0274772 A1 | 10/2010 | Samuels | |
| 2011/0051930 A1* | 3/2011 | Yeh | G06F 21/53 380/45 |
| 2012/0293354 A1 | 11/2012 | Suzuki | |

(Continued)

OTHER PUBLICATIONS

Arnold et al. "IBM 4765 cryptographic coprocessor." IBM Journal of Research and Development 56.1.2, Mar. 2012, pp. 1-13.
IBM, "z/Architecture—Principles of Operation," IBM Publication No. SA22-7832-11, Twelfth Edition, Sep. 2017, pp. 1-1902.

(Continued)

*Primary Examiner* — Mahfuzur Rahman
(74) *Attorney, Agent, or Firm* — Steven Chiu, Esq.; Blanche E. Schiller, Esq.; Heslin Rothenberg Farley & Mesiti P.C.

(57) ABSTRACT

A protected key to be used by a select processor on behalf of an entity unauthorized to use the protected key is created. The creating includes obtaining a system mask and a system key. A clear key is wrapped with the system key to provide a wrapped key. The system mask is applied to the wrapped key to create the protected key.

20 Claims, 11 Drawing Sheets

(56) References Cited

U.S. PATENT DOCUMENTS

| | | |
|---|---|---|
| 2013/0129081 A1* | 5/2013 | Guillet .................... H04L 9/003 380/28 |
| 2014/0301545 A1 | 10/2014 | Glider |
| 2015/0286833 A1 | 10/2015 | Resch |
| 2016/0062918 A1 | 3/2016 | Androulaki et al. |
| 2016/0065540 A1 | 3/2016 | Androulaki et al. |
| 2018/0034787 A1 | 2/2018 | Kamaraju |
| 2018/0139046 A1 | 5/2018 | Brueckner et al. |
| 2018/0165224 A1 | 6/2018 | Brown |
| 2018/0196947 A1 | 7/2018 | Davis |
| 2018/0329635 A1 | 11/2018 | Vijayan et al. |
| 2018/0329993 A1 | 11/2018 | Bedadala et al. |
| 2018/0332145 A1 | 11/2018 | Balassanian |
| 2019/0171379 A1 | 6/2019 | Van Riel |
| 2019/0199617 A1 | 6/2019 | Kalyanasundharam |
| 2021/0081547 A1* | 3/2021 | Marson ................. H04L 9/0822 |

OTHER PUBLICATIONS

Johnson, et al. "On compressing encrypted data." IEEE Transactions on Signal Processing 52.10, Oct. 2004, pp. 1-15.

Jordan et al. "Enabling pervasive encryption through IBM Z stack innovations." IBM Journal of Research and Development 62.2/3, May 2018, pp. 1-11.

Mell, Peter and Tim Grance, "The NIST Definition of Cloud Computing," National Institute of Standards and Technology, Information Technology Laboratory, Special Publication 800-145, Sep. 2011, pp. 1-7.

Surman et al. "IBM z14 Parallel Sysplex and coupling technology." IBM Journal of Research and Development 62.2/3, May 2018, pp. 1-8.

List of IBM Patents or Patent Applications Treated as Related, Mar. 26, 2019, pp. 1-2.

Sofia, Anthony T. et al., "Employing A Protected Key In Performing Operations," U.S. Appl. No. 16/364,271, filed Mar. 26, 2019, pp. 1-41.

* cited by examiner

CREATING A PROTECTED KEY TO BE USED BY A SELECT PROCESSOR ON BEHALF OF AN ENTITY UNAUTHORIZED TO USE THE PROTECTED KEY —600

THE CREATING INCLUDES

OBTAINING A SYSTEM MASK AND A SYSTEM KEY —602

WRAPPING A CLEAR KEY WITH THE SYSTEM KEY TO PROVIDE A WRAPPED KEY —604

APPLYING THE SYSTEM MASK TO THE WRAPPED KEY TO CREATE THE PROTECTED KEY —606

THE APPLYING THE SYSTEM MASK INCLUDES PERFORMING AN EXCLUSIVE OR OF THE SYSTEM MASK AND THE WRAPPED KEY —608

THE SYSTEM KEY IS AN ADVANCED ENCRYPTION STANDARD (AES) 256 BIT KEY

THE SYSTEM MASK IS 32 BYTES —612　　　　610

THE SYSTEM MASK IS RANDOMLY GENERATED AT AN INITIAL LOAD TIME OF THE COMPUTING ENVIRONMENT —614

THE INITIAL LOAD TIME IS AN INITIAL MICROPROGRAM LOAD TIME OF THE COMPUTING ENVIRONMENT —616

THE CREATING IS PERFORMED BASED ON A REQUEST FOR THE PROTECTED KEY —618

FIG. 6A

GENERATING A PROTECTED KEY FOR SELECTIVE USE

BACKGROUND

One or more aspects relate, in general, to facilitating processing within a computing environment, and in particular, to facilitating processing of select operations within the computing environment while protecting data.

To protect data within a computing environment, cryptography is used. Cryptography includes encrypting data such that only authorized parties can read the data. For example, during encryption, data in plaintext is encoded using an encryption technique to provide encrypted data or cipher text. The encrypted data is sent to an authorized recipient. The recipient receives the encrypted data and decrypts it using the same encryption technique to provide the plaintext of the data.

With current technology, to transparently encrypt the data for applications, the owner of the data owns key material associated with encrypting the data. Only users who have access to the key material are able to see the data in the clear; other users receive an exception when attempting to access the key material from the key store, due to a lack of permissions, or only see the encrypted data, in attempting to read the data directly from storage (e.g., disk).

A storage administrator is responsible for backing up and restoring the data owned by many different users. However, the storage administrator should not have access to the data in the clear (i.e., the plaintext of the data). This limits the operations able to be performed by the storage administrator.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes creating a protected key to be used by a select processor on behalf of an entity unauthorized to use the protected key. The creating includes obtaining a system mask and a system key. A clear key is wrapped with the system key to provide a wrapped key. The system mask is applied to the wrapped key to create the protected key.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 6A-6B depict one example of facilitating processing within a computing environment, in accordance with an aspect of the present invention;

DETAILED DESCRIPTION

In accordance with an aspect of the present invention, a capability is provided to facilitate processing within a computing environment. As one example, a capability is provided to create a protected key used by a select processor, such as a co-processor, e.g., a system assist processor, in decrypting/encrypting user data, in which the user's clear data is only visible to the select processor (e.g., to the firmware of the system assist processor) and not to other entities, such as a system administrator and/or components, including but not limited to, the host system or requesting operating system.

In a further aspect, a capability is provided to expand the available operations to be performed for selective entities, such as system administrators. For example, this capability includes providing the selective entities with the ability to have select operations performed on a user's data absent having the user's key material and/or access to the user's data in the clear. One such select operation is compression of the user's data to back-up compressed data. In this aspect, the system assist processor, as an example, is provided the protected key and the user's data in encrypted form. The system assist processor uses the protected key to decrypt the user's data, perform an operation on the decrypted data (e.g., compression), and then encrypt the data (e.g., the compressed data). The encrypted data is then returned to the system requesting the operation. In the case in which a back-up is to be created, the requesting system stores the encrypted compressed data on, for instance, a back-up volume.

One example of a computing environment to incorporate and use one or more aspects of the present invention is described with reference to FIG. 1. In one example, the computing environment is based on a z/Architecture hardware architecture offered by International Business Machines Corporation, Armonk, N.Y.; however, the computing environment may be based on other architectures offered by International Business Machines Corporation or others. One embodiment of the z/Architecture hardware architecture is described in a publication entitled, "z/Architecture Principles of Operation," IBM Publication No. SA22-7832-11, 12$^{th}$ edition, September 2017, which is hereby incorporated herein by reference in its entirety. The z/Architecture hardware architecture, however, is only one example architecture; other architectures and/or other types of computing environments may include and/or use one or more aspects of the present invention.

Figure 1:
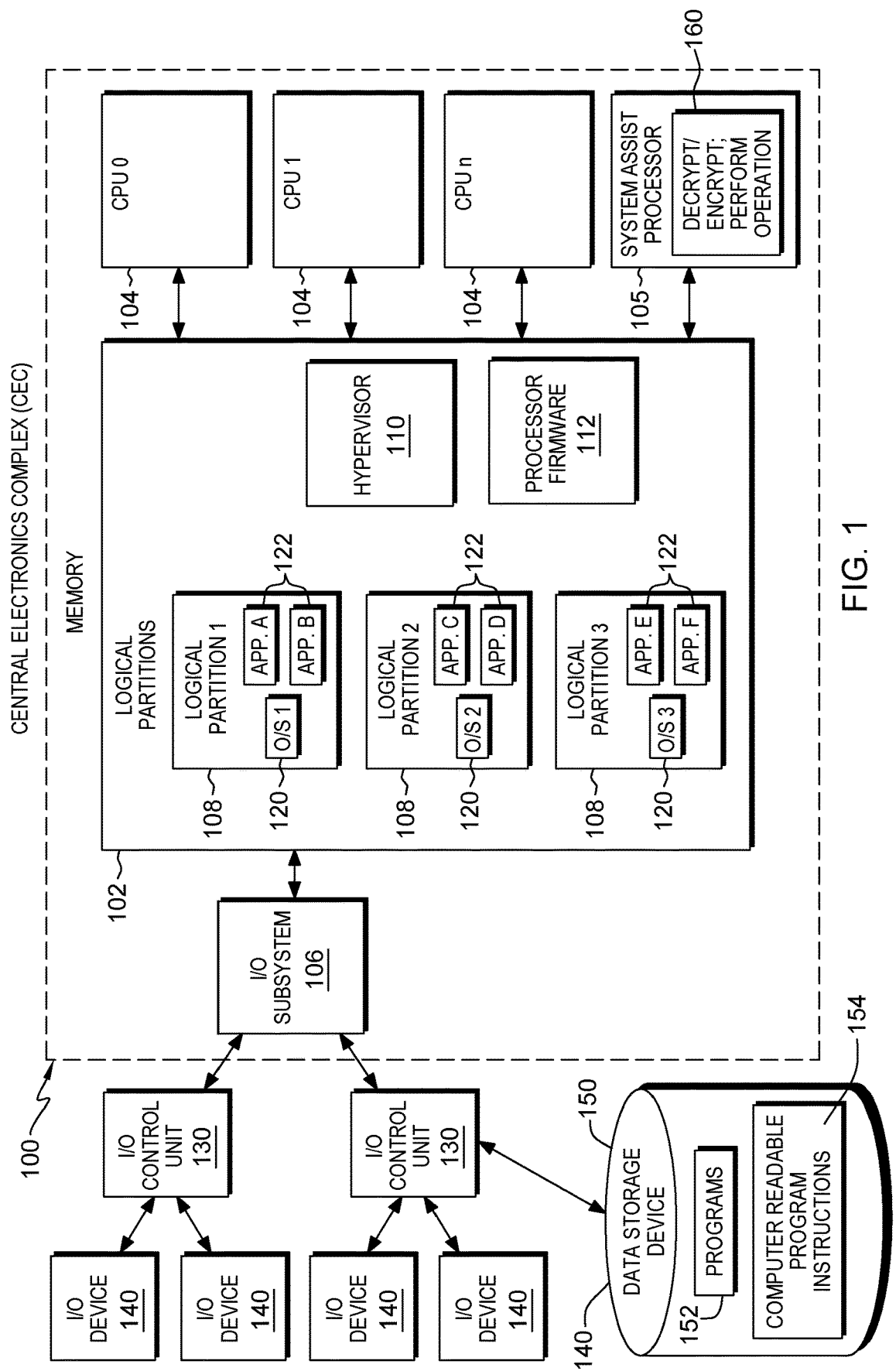
FIG. 1 depicts one example of a computing environment to incorporate and use one or more aspects of the present invention.

Referring to FIG. 1, in one example, the computing environment includes a central electronics complex (CEC) 100. CEC 100 includes a plurality of components, such as, for instance, a memory 102 (a.k.a., system memory, main memory, main storage, central storage, storage) coupled to one or more processors (a.k.a., central processing units (CPUs)) 104, one or more co-processors, such as a system assist processor 105, and to an input/output subsystem 106.

Memory 102 includes, for example, one or more logical partitions 108, a hypervisor 110 that manages the logical partitions, and processor firmware 112. One example of hypervisor 110 is the Processor Resource/System Manager (PR/SM™) hypervisor, offered by International Business Machines Corporation, Armonk, N.Y. As used herein, firmware includes, e.g., the microcode of the processors (e.g., CPU 104 and system assist processor 105). It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Each logical partition 108 is capable of functioning as a separate system. That is, each logical partition can be independently reset, run a guest operating system 120, such as a z/OS operating system offered by International Business Machines Corporation, Armonk, N.Y., or another operating system, and operate with different programs 122. An operating system or application program running in a logical partition appears to have access to a full and complete system, but in reality, only a portion of it is available.

Memory 102 is coupled to processors 104, which are physical processor resources that may be allocated to the logical partitions. For instance, a logical partition 108 includes one or more logical processors, each of which represents all or a share of a physical processor resource 104 that may be dynamically allocated to the logical partition.

Further, memory 102 is coupled to system assist processor 105, which, in accordance with one or more aspects, includes and/or has access to a decrypt/encrypt, perform operation component (or other component) 160 used in performing decryption/encryption, as well as other operations, on user's data based on a request, e.g., from a host processor (e.g., processor 104). In various examples, there may be one or more components performing these tasks. Many variations are possible.

Moreover, memory 102 is coupled to I/O subsystem 106. I/O subsystem 106 may be a part of the central electronics complex or separate therefrom. It directs the flow of information between main storage 102 and input/output control units 130 and input/output (I/O) devices 140 coupled to the central electronics complex.

Many types of I/O devices may be used. One particular type is a data storage device 150. Data storage device 150 may store one or more programs 152, one or more computer readable program instructions 154, and/or data, etc. The computer readable program instructions may be configured to carry out functions of embodiments of aspects of the invention.

Central electronics complex 100 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 100. Examples include, but are not limited to: microcode, device drivers, redundant processing units, external disk drive arrays, RAID systems, tape drives, and data archival storage systems, etc.

Further, central electronics complex 100 may be operational with numerous other general purpose or special purpose computing system environments or configurations. Examples of well-known computing systems, environments, and/or configurations that may be suitable for use with central electronics complex 100 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

In accordance with an aspect of the present invention, a protected key is created for use in performing select operations on data of one or more users, while protecting the users' data so that the users' data is not visible in the clear to a system administrator, an operating system, a logical partition, or to a processor, other than a select co-processor (e.g., the system assist processor). Further details relating to creating the protected key are described with reference to FIGS. 2-3.

Figure 2:
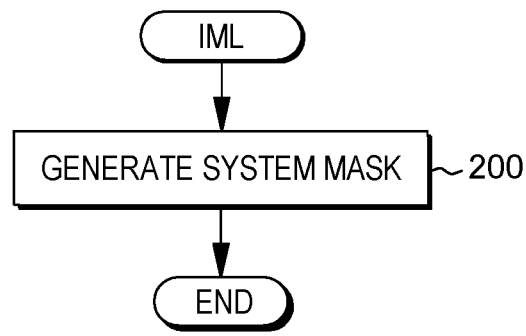
FIG. 2 depicts one example of generating a system mask used to create a protected key, in accordance with an aspect of the present invention.

Referring initially to FIG. 2, at IML (initial microprogram load) time of a processor (e.g., processor 104), referred to herein as a host system, a system mask is generated, STEP 200. In one example, the mask is 32 bytes long and is randomly generated by, for instance, a random generator. In other embodiments, the mask may be of different lengths and created in any desired manner. The system mask is used to create a protected key, as described with reference to FIG. 3.

Figure 3:
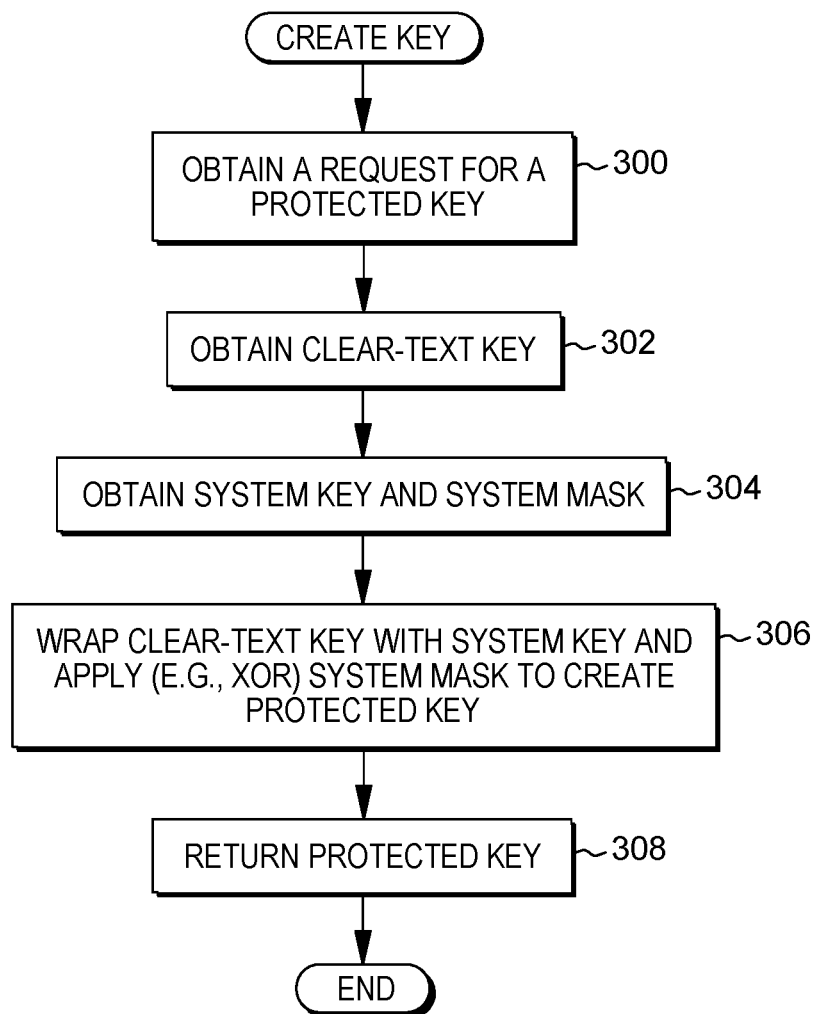
FIG. 3 depicts one example of creating a protected key using the system mask generated in FIG. 2, in accordance with an aspect of the present invention.

Referring to FIG. 3, in one example, the host system obtains (e.g., receives, is provided, has, etc.) a request for a protected key via, for instance, an instruction issued by, e.g., an operating system (e.g., z/OS) of the host system or by any other mechanism, STEP 300. The request includes, for instance, a secure wrapped key. Based on the request, the host system obtains a clear-text key, STEP 302. For instance, the secure wrapped key is unwrapped (e.g., by a crypto-express device of the host system) to provide the clear-text key.

Further, the host system obtains a system key (a.k.a., a basic-machine-level key) and the system mask, STEP 304.

The system key is, for instance, an Advanced Encryption Standard (AES) 256 bit key. The host system wraps the clear-text key with the system key to provide a wrapped key, and applies the system mask to the wrapped key to create the protected key, STEP 306. In one example, the wrapping includes using symmetric encryption to encapsulate the clear-text key. Various key wrapping routines may be used to perform a key wrap, such as an AES key wrap, to provide the wrapped key. The system mask is then applied to the wrapped key by, for instance, performing an exclusive OR (XOR) of the system mask and the wrapped key.

The protected key is then returned to the requestor (e.g., the operating system) using, for instance, an instruction or any other mechanism, STEP 308. This protected key is not usable by the host system, the requesting operating system, a logical partition, the hypervisor or any other component, except for the select processor, e.g., system assist processor, and in particular, as an example, the firmware of the system assist processor. The requesting operating system or other requestor of the protected key is authorized to provide (e.g., pass, forward, etc.) the protected key to the select processor, but not authorized to use the key in operations, such as decryption/encryption operations. In other embodiments, another specific processor, device, component, etc., other than the requesting processor or component, may be provided the authorization or privilege to use the protected key.

The protected key may be used to perform many tasks. For instance, the protected key may be used for the re-keying of data. For example, a system administrator may run a process to re-key a user's data set. In this case, an input protected key is used for decryption and an output protected key is used for encryption, so that the output again would be protected by the user's (new) key.

In another example, the protected key is used to enable, e.g., a system administrator, to provide back-up of compressed data. For instance, the protected key is used in the decryption/encryption of data in order to allow select operations to be performed on the data, such as compression and/or other operations. Other example tasks are also possible.

One embodiment of using the protected key is described with reference to FIG. 4A. As an example, a select processor, such as system assist processor 105, obtains a request to perform an operation on encrypted data, STEP 400. The request includes, for instance, the encrypted data and the protected key, and is obtained (e.g., received, provided, pulled, etc.) from a processor (e.g., processor 104). The select processor copies the data and decrypts the data using the protected key, STEP 402. Further details regarding decrypting the data are described with reference to FIG. 4B.

Figure 4A:
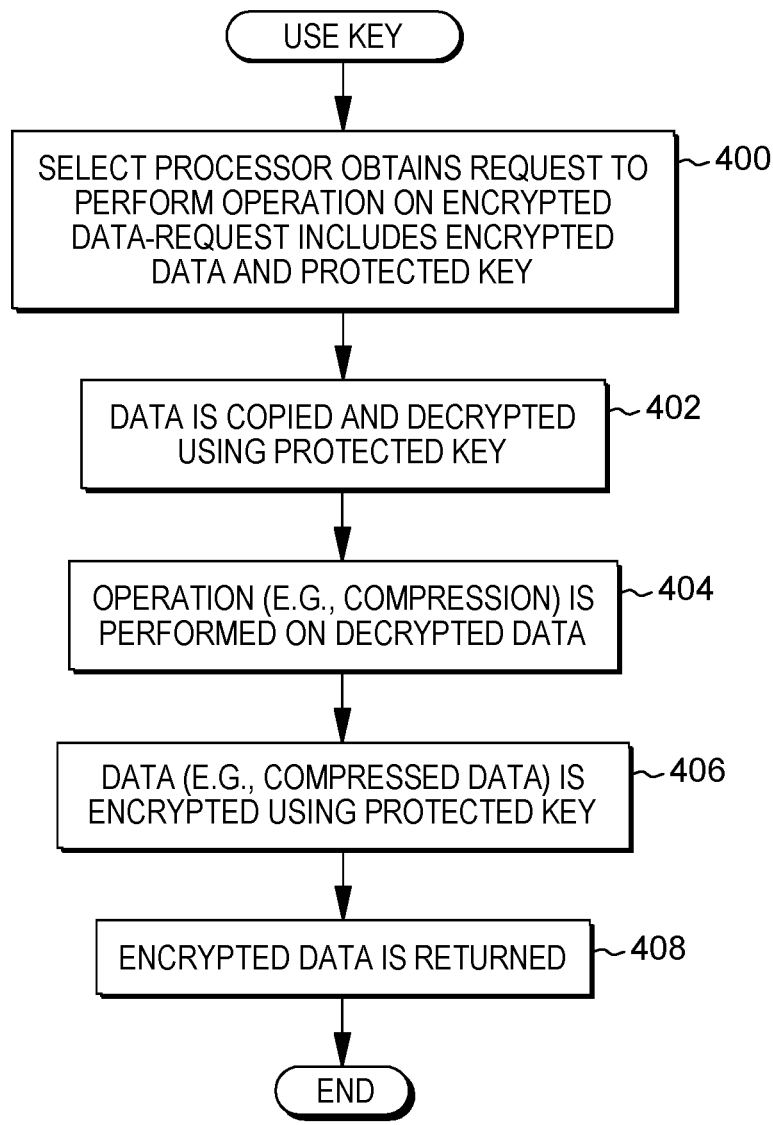
FIG. 4A depicts one example of using the protected key created in FIG. 3, in accordance with an aspect of the present invention.
Figure 4B:
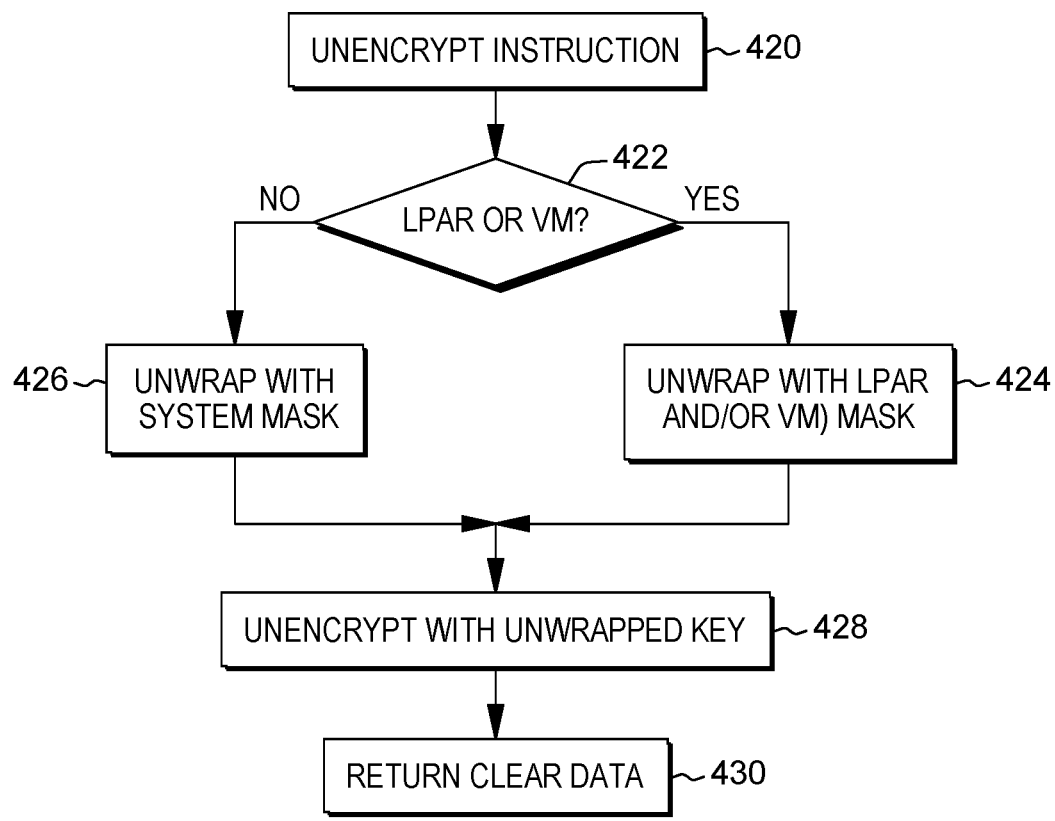
FIG. 4B depicts one example of decryption processing employed in using the protected key, in accordance with an aspect of the present invention.

Referring to FIG. 4B, an unencrypt (or decrypt) instruction is executed, STEP 420, and a determination is made as to whether a host system (e.g., logical partition or virtual machine) or system assist processor is executing the instruction, INQUIRY 422. If the host system is executing the instruction, the protected key is unwrapped using a mask specific to the logical partition or virtual machine, STEP 424. For instance, a key wrapped using the LPAR and/or VM specific mask is only usable by that particular logical partition or virtual machine.

However, if the system assist processor is executing the unencrypt instruction, then, in accordance with an aspect of the present invention, the protected key is unwrapped with the system mask (e.g., performing an XOR), STEP 426. The system mask is not for a given logical partition or virtual machine, and therefore, does not restrict usage of the system mask by the system assist processor.

Subsequent to unwrapping the key, either using the system mask or LPAR/VM mask, the encrypted data is decrypted using the unwrapped key to provide clear data, STEP 428. Any number of decryption techniques may be used to decrypt the data using the unwrapped key. The clear data is returned, STEP 430. In one example in which the system assist processor is executing the unencrypt instruction, the clear data is returned to the system assist processor for further processing, as described with reference to FIG. 4A.

Continuing with FIG. 4A, the requested operation is performed on the decrypted data, STEP 404. In one example, the requested operation is compression. Therefore, the select processor compresses the decrypted data providing compressed data.

Thereafter, in this example, the select processor encrypts the compressed data using the protected key, STEP 406. Further details regarding decrypting the data are described with reference to FIG. 4C.

Figure 4C:
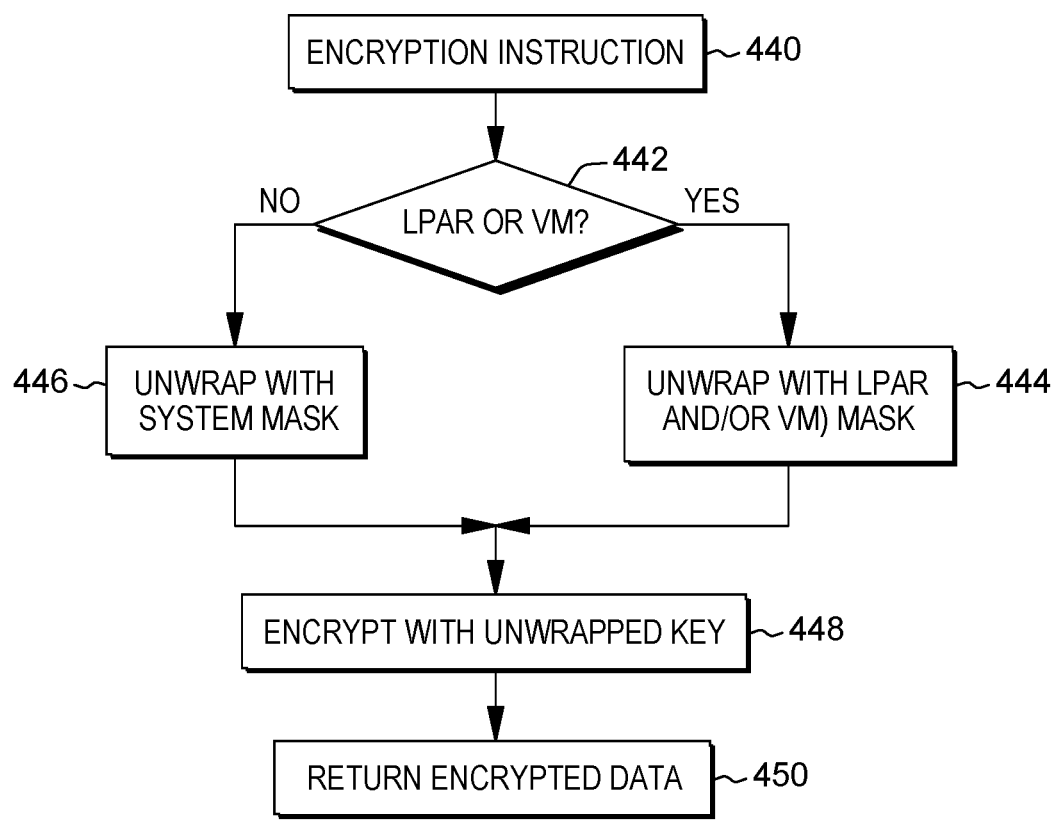
FIG. 4C depicts one example of encryption processing employed in using the protected key, in accordance with an aspect of the present invention.

Referring to FIG. 4C, an encryption instruction is executed, STEP 440, and a determination is made as to whether a host system (e.g., logical partition or virtual machine) or system assist processor is executing the instruction, INQUIRY 442. If the host system is executing the instruction, the protected key is unwrapped using a mask specific to the logical partition or virtual machine, STEP 444.

However, if the system assist processor is executing the encryption instruction, then, in accordance with an aspect of the present invention, the protected key is unwrapped with the system mask (e.g., performing an XOR), STEP 446.

Subsequent to unwrapping the key, either using the system mask or LPAR/VM mask, the data is encrypted using the unwrapped key to provide encrypted, compressed data, STEP 448. Any number of encryption techniques may be used to encrypt the data using the unwrapped key. The encrypted, compressed data is returned, STEP 450. In one example in which the system assist processor is executing the encryption instruction, the encrypted, compressed data is returned to the system assist processor for further processing, as described with reference to FIG. 4A.

Continuing with FIG. 4A, the encrypted compressed data is returned to the requestor, STEP 408. In one example, the requestor is an operating system requesting on behalf of a system administrator that a user's data be compressed, e.g., for back-up purposes.

Although in the above example the requested operation is compression; in other examples, other operations may be performed. Compression is only one example operation.

Figure 5:
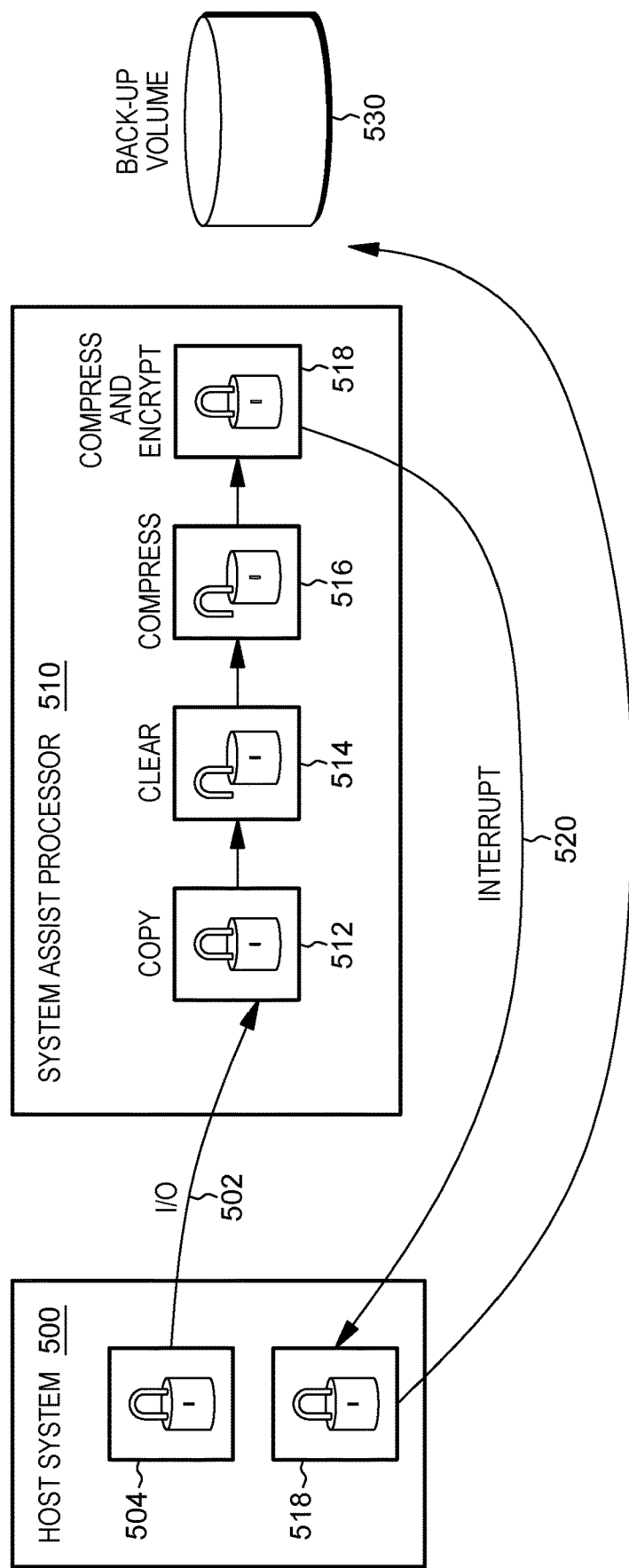
FIG. 5 depicts one example of a system assist processor used to perform an operation on data encrypted/decrypted using a protected key, in accordance with an aspect of the present invention.

One pictorial depiction of using the protected key is described with reference to FIG. 5. As depicted, in one example, a host system 500 sends a request 502, via, e.g., an input/output (I/O) command, to a select processor, such as a system assist processor 510. The request includes encrypted data 504. This encrypted data is in an uncompressed form and it is requested that it be compressed to save space and time in using the data. The request with the encrypted data and the protected key is received by system assist processor 510. System assist processor 510 copies 512 the encrypted data and decrypts it using the protected key, providing the data in the clear 514. This clear data, however, is only visible to the system assist processor (e.g., firmware of that processor). It is not visible to the host system, requestor (e.g., requesting operating system), logical partition, hypervisor, system administrator, users, etc.

Based on the requested operation of compression, the system assist processor compresses 516 the clear data providing compressed data, and then encrypts 518 the compressed data using the protected key, providing compressed, encrypted data. The compressed, encrypted data 518 is sent 520, e.g., via an interrupt or any other mechanism, back to host system 500. The compressed, encrypted data may then be stored on a back-up volume 530.

As described herein, a protected key only usable by a select processor, such as a system assist processor, and in particular, firmware of the system assist processor, is used to perform select operations on data in the clear, such as compression, allowing those operations to be performed while still protecting the data. As an example, the copying, decrypting, compressing (or other operation) and encrypting are performed atomically by the select processor, protecting the data.

By using a protected key, only usable by the select processor on behalf of, but not by, a host system, logical partition, operating system, requestor, etc., the select processor can perform operations, such as compression, on the received data while protecting the data. The protected key is not usable by one component (e.g., operating system, host system, logical partition, etc.) to perform select operations (e.g., decrypt, compress, encrypt), but is provided by the one component to another component (e.g., system assist processor) for use by the other component to perform the select operations. The protected key is unavailable for use by the one component or in the host system that includes the one component, except for passing the protected key to another component for use on behalf of the one component.

As described herein, in one particular example, a single service is provided that allows for data to be decrypted, compressed and encrypted, without exposing the intermediate results back to the calling application. This allows, for example, a backup application to provide compression to data that is encrypted without exposing the clear information into the memory of the host system and without the data being inaccessible to the backup application. Further, in one example, the same data flow for restoring of back-up data is also provided. This would be for a decrypt, decompress, and re-encrypt operation. Data that was compressed and encrypted is restored providing encrypted (uncompressed) data without exposing the data to, e.g., the restoring application.

Although particular operations are described herein, one or more aspects are usable in performing other operations. Many variations exist.

One or more aspects of the present invention are inextricably tied to computer technology and facilitate processing within a computer, improving performance thereof. By providing a protected key that may be used to protect data while performing certain operations, processing is facilitated. Further, performance is enhanced, and storage requirements are reduced. One or more aspects may be used in many technical fields, such as in computer processing, medical processing, security, etc. By providing optimizations in performing certain operations, such as compression, these technical fields are improved by reducing execution time and reducing the amount of needed storage.

Further details of one embodiment of facilitating processing within a computing environment, as it relates to one or more aspects of the present invention, are described with reference to FIGS. 6A-6B.

Referring to FIG. 6A, in one example, a protected key to be used by a select processor on behalf of an entity unauthorized to use the protected key is created (600). The creating includes, for instance, obtaining a system mask and a system key (602). A clear key is wrapped with the system key to provide a wrapped key (604). The system mask is applied to the wrapped key to create the protected key (606). In one example, the applying the system mask includes performing an exclusive OR of the system mask and the wrapped key (608).

As examples, the system key is an Advanced Encryption Standard (AES) 256 bit key (610), and the system mask is 32 bytes (612).

In one example, the system mask is randomly generated at an initial load time of the computing environment (614). The initial load time is, for instance, an initial microprogram load (IML) time of the computing environment (616). Further, in one example, the creating is performed based on a request for the protected key (618).

Figure 6B:
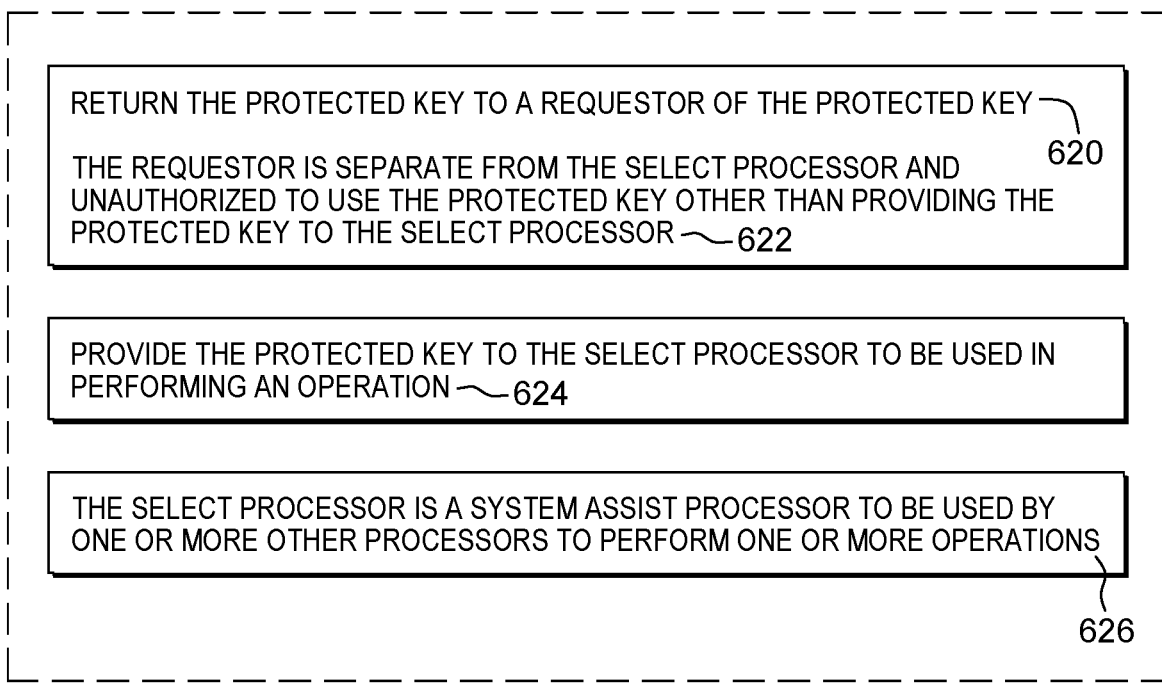

In one embodiment, referring to FIG. 6B, the protected key is returned to a requestor of the protected key (620). The requestor is separate from the select processor and unauthorized to use the protected key other than providing the protected key to the select processor (622). The protected key is provided, in one embodiment, to the select processor to be used in performing an operation (624). Example operations include compression or restoration. Other operations are possible.

In one example, the select processor is a system assist processor to be used by one or more other processors to perform one or more operations (626).

Other variations and embodiments are possible.

Figure 7A:
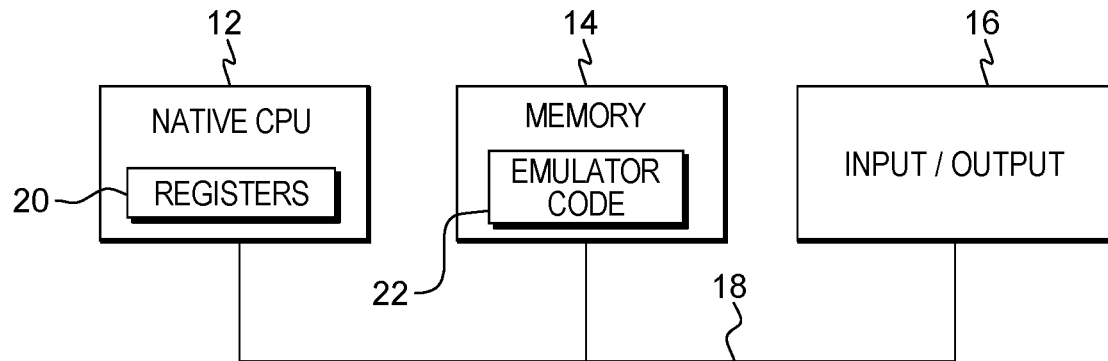
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
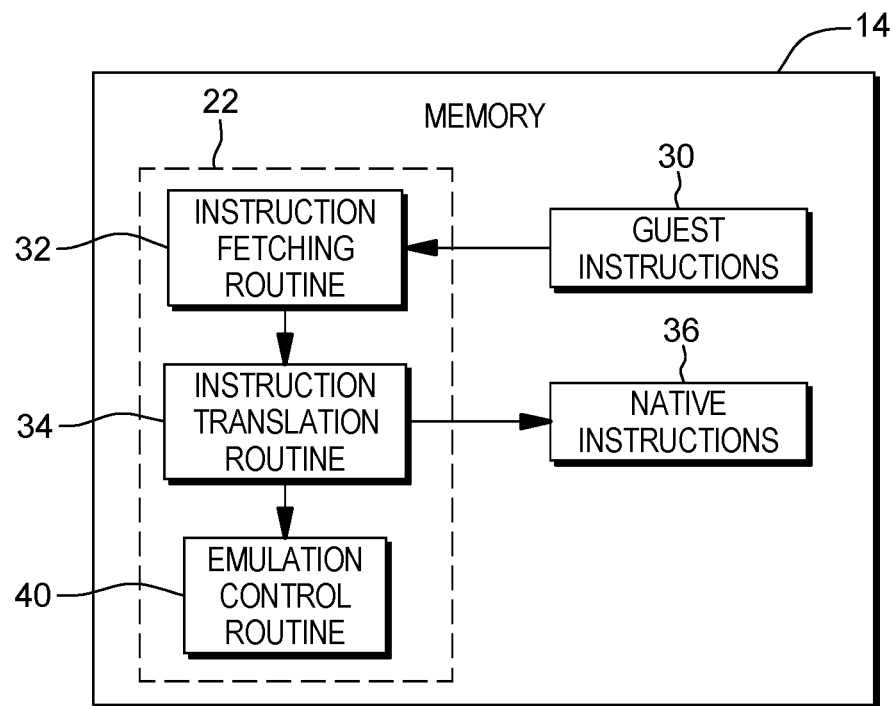
FIG. 7B depicts further details of the memory of FIG. 7A.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to atomically perform decryption, compression and encryption, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
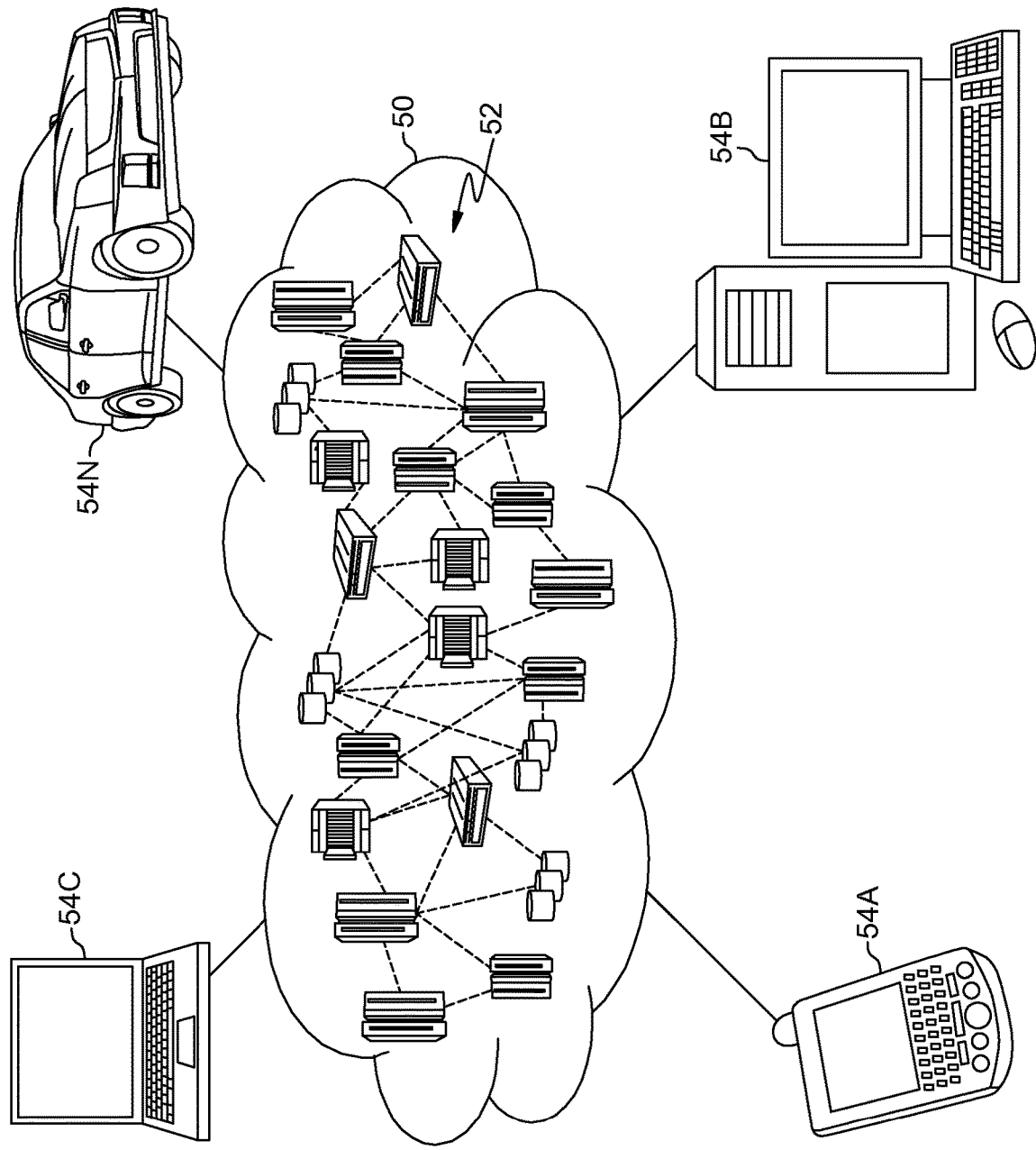
FIG. 8 depicts one embodiment of a cloud computing environment.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
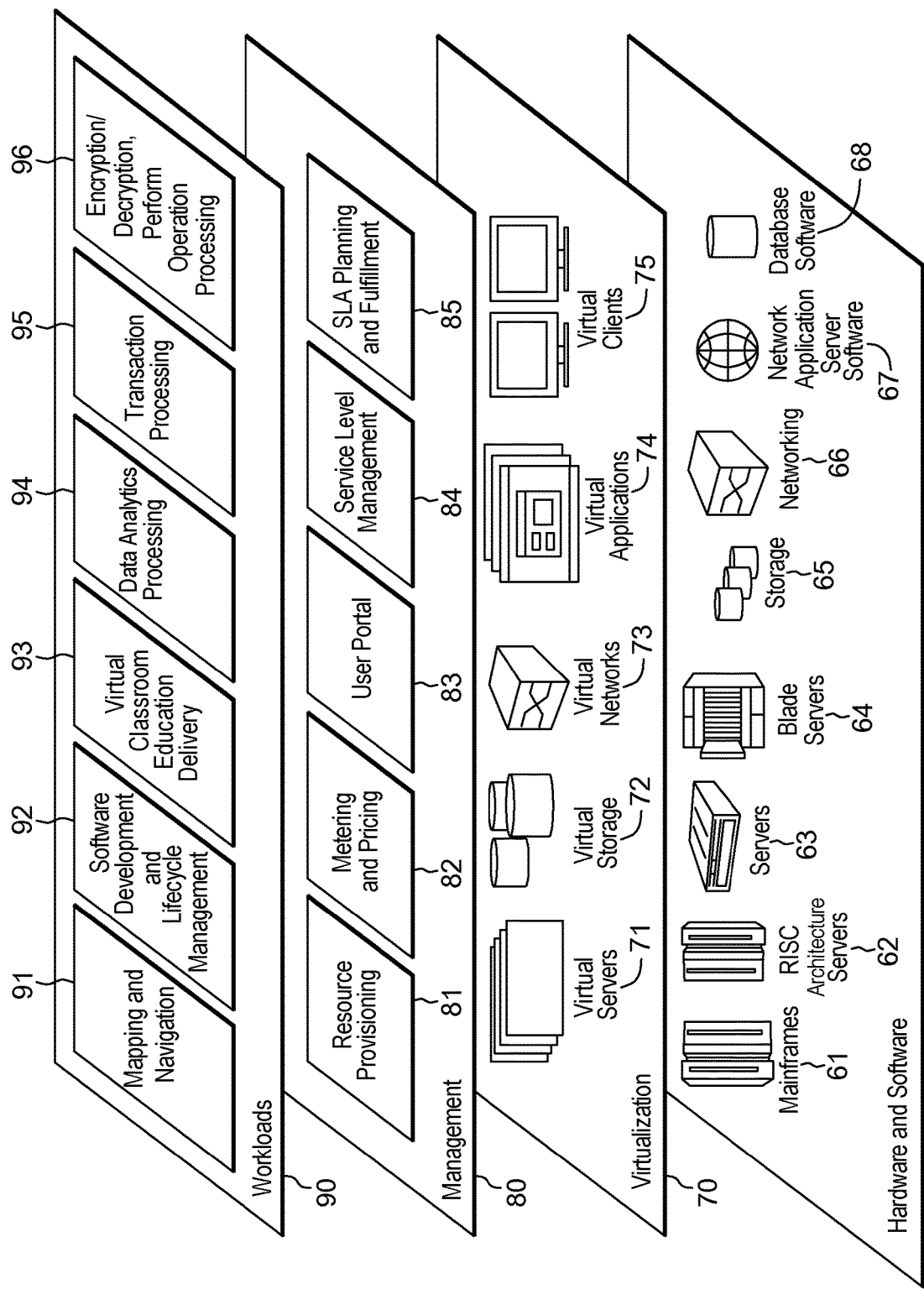
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption/decryption, perform operation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different masks may be used and/or other types of cryptography algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      creating a protected key to be used by a select processor on behalf of an entity unauthorized to use the protected key, wherein the creating is performed based on a request for the protected key, the creating comprising:
         obtaining a system mask and a system key;
         wrapping a clear key with the system key to provide a wrapped key; and
         applying the system mask to the wrapped key to create the protected key.

2. The computer program product of claim 1, wherein the applying the system mask comprises performing an exclusive OR of the system mask and the wrapped key.

3. The computer program product of claim 2, wherein the system key is an Advanced Encryption Standard (AES) 256 bit key.

4. The computer program product of claim 3, wherein the system mask is 32 bytes.

5. The computer program product of claim 1, wherein the system mask is randomly generated at an initial load time of the computing environment.

6. The computer program product of claim 5, wherein the initial load time is an initial microprogram load time of the computing environment.

7. The computer program product of claim 1, wherein the method further comprises returning the protected key to a requestor of the protected key, the requestor being separate from the select processor and unauthorized to use the protected key other than providing the protected key to the select processor.

8. The computer program product of claim 7, wherein the method further comprises providing the protected key to the select processor to be used in performing an operation.

9. The computer program product of claim 1, wherein the select processor is a system assist processor to be used by one or more other processors to perform one or more operations.

10. A computer system for facilitating processing within a computing environment, the computer system comprising:
    a memory; and
    a processor in communication with the memory, wherein the computer system is configured to perform a method, said method comprising:
       creating a protected key to be used by a select processor on behalf of an entity unauthorized to use the protected key, wherein the creating is performed based on a request for the protected key, the creating comprising:
          obtaining a system mask and a system key;
          wrapping a clear key with the system key to provide a wrapped key; and
          applying the system mask to the wrapped key to create the protected key.

11. The computer system of claim 10, wherein the applying the system mask comprises performing an exclusive OR of the system mask and the wrapped key.

12. The computer system of claim 10, wherein the system mask is randomly generated at an initial load time of the computing environment.

13. The computer system of claim 10, wherein the method further comprises returning the protected key to a requestor of the protected key, the requestor being separate from the select processor and unauthorized to use the protected key other than providing the protected key to the select processor.

14. The computer system of claim 10, wherein the select processor is a system assist processor to be used by one or more other processors to perform one or more operations.

15. The computer system of claim 13, wherein the method further comprises providing the protected key to the select processor to be used in performing an operation.

16. A computer-implemented method of facilitating processing within a computing environment, the computer-implemented method comprising:
    creating a protected key to be used by a select processor on behalf of an entity unauthorized to use the protected key, wherein the creating is performed based on a request for the protected key, the creating comprising:
       obtaining a system mask and a system key;
       wrapping a clear key with the system key to provide a wrapped key; and
       applying the system mask to the wrapped key to create the protected key.

17. The computer-implemented method of claim 16, wherein the applying the system mask comprises performing an exclusive OR of the system mask and the wrapped key.

18. The computer-implemented method of claim 16, wherein the system mask is randomly generated at an initial load time of the computing environment.

19. The computer-implemented method of claim 16, wherein the method further comprises returning the protected key to a requestor of the protected key, the requestor being separate from the select processor and unauthorized to use the protected key other than providing the protected key to the select processor.

20. The computer-implemented method of claim 16, wherein the select processor is a system assist processor to be used by one or more other processors to perform one or more operations.

\* \* \* \* \*